(12) United States Patent
Eggert et al.

(10) Patent No.: US 9,208,576 B2
(45) Date of Patent: Dec. 8, 2015

(54) TWO-STAGE CORRELATION METHOD FOR CORRESPONDENCE SEARCH

(75) Inventors: Julian Eggert, Obertshausen (DE); Nils Einecke, Mühlheim (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 991 days.

(21) Appl. No.: 13/102,466

(22) Filed: May 6, 2011

(65) Prior Publication Data

US 2011/0279652 A1    Nov. 17, 2011

(30) Foreign Application Priority Data

May 14, 2010    (EP) ..................................... 10162822
Aug. 17, 2010   (EP) ..................................... 10173087

(51) Int. Cl.
  *G06T 7/20*    (2006.01)
  *G06T 7/00*    (2006.01)

(52) U.S. Cl.
  CPC ............. *G06T 7/204* (2013.01); *G06T 7/0075* (2013.01); *G06T 7/2086* (2013.01); *G06T 2207/10021* (2013.01); *G06T 2207/10024* (2013.01); *G06T 2207/20021* (2013.01); *G06T 2207/30252* (2013.01)

(58) Field of Classification Search
  CPC ..... G06T 7/0075; G06T 7/204; G06T 7/2086; G06T 2207/10021; G06T 2207/10024; G06T 2207/20021; G06T 2207/30252
  See application file for complete search history.

(56) References Cited

U.S. PATENT DOCUMENTS

| | | | | |
|---|---|---|---|---|
| 6,219,462 | B1 * | 4/2001 | Anandan et al. | 382/294 |
| 6,970,591 | B1 * | 11/2005 | Lyons et al. | 382/154 |
| 7,706,633 | B2 * | 4/2010 | Chefd'hotel et al. | 382/294 |
| 7,822,267 | B2 * | 10/2010 | Gu | 382/154 |
| 7,929,728 | B2 * | 4/2011 | Guo et al. | 382/103 |
| 8,155,452 | B2 * | 4/2012 | Minear | 382/218 |
| 8,331,615 | B2 * | 12/2012 | Furukawa et al. | 382/103 |
| 8,442,304 | B2 * | 5/2013 | Marrion et al. | 382/154 |
| 2003/0126448 | A1 * | 7/2003 | Russo | 713/186 |
| 2005/0123191 | A1 * | 6/2005 | Zhang et al. | 382/154 |
| 2005/0286767 | A1 * | 12/2005 | Hager et al. | 382/190 |
| 2009/0172606 | A1 * | 7/2009 | Dunn et al. | 715/863 |

(Continued)

OTHER PUBLICATIONS

Di Stefano et al. ("A fast area-based stereo matching algorithm", Image and Vision Computing, vol. 22, Issue 12, Oct. 1, 2004, pp. 983-1005, ISSN 0262-8856).*

(Continued)

*Primary Examiner* — Behrooz Senfi
*Assistant Examiner* — Maria Vazquez Colon
(74) *Attorney, Agent, or Firm* — Squire Patton Boggs (US) LLP

(57) ABSTRACT

The invention presents a method for comparing the similarity between image patches comprising the steps of receiving form at least two sources at least two image patches, wherein each source supplies an image patch, comparing the received image patches by extracting a number of corresponding subpart pairs from each image patch, calculating a normalized local similarity score between all corresponding subpart pairs, calculating a total matching score by integrating the local similarity scores of all corresponding subpart pairs, and using the total matching score as an indicator for an image patch similarity, determining corresponding similar image patches based on the total matching score.

27 Claims, 6 Drawing Sheets

(56) References Cited

U.S. PATENT DOCUMENTS

2010/0277571 A1* 11/2010 Xu et al. .................. 348/47
2011/0255741 A1* 10/2011 Jung et al. ................ 382/103

OTHER PUBLICATIONS

Abbasi-Dezfouli et al. ("Patch Matching in Stereo-Images Based on Shape"; Proc. SPIE 2357, ISPRS Commission III Symposium: Spatial Information from Digital Photogrammetry and Computer Vision, 1 (Aug. 17, 1994); doi:10.1117/12.182856).*

M. Abbasi-Dezfouli ; T. Graham Freeman; Patch matching in stereo images based on shape. Proc. SPIE 2357, ISPRS Commission III Symposium: Spatial Information from Digital Photogrammetry and Computer Vision, 1 (Aug. 17, 1994).*

Scharstein et al. ("A Taxonomy and Evaluation of Dense Two-Frame Stereo Corresponding Algorithms", International Journal of Computer Vision, 47(1/2/3), 7-42, 2002).*

Partial European Search Report Issued in European Patent Application No. 10173087.7 dated Jan. 17, 2011.

Remondino F. et al., "Turning Images into 3-D Models," IEEE Signal Processing Magazine, IEEE Service Center, vol. 25, No. 4, Jul. 1, 2008, pp. 55-65, XP011228191.

Lutz Falkenhagen, "Blockbasierte Disparitatsschatzung under Berucksichtigung Statistischer Abhangigkeiten der Disparitaten," Dissertation, Jan. 1, 2001, p. 115PP, XP009135281.

Scharstein D. et al., "A Taxonomy and Evaluation of Dense Two-Frame Stereo Correspondence Algorithms," Stereo and Multi-Baseline Vision, 2001. Proceedings IEEE Workshop on Kauai, HI, Dec. 9-10, 2001, Los Alamitos, CA, IEEE Comput. Soc., Dec. 9, 2001, pp. 131-140, XP010582733.

Yang, Qingxiong et al., "Stereo Matching with Color-Weighted Correlation, Hierarchical Belief Propagation, and Occlusion Handling", IEEE Transactions on Pattern Analysis and Machine Intelligence, vol. 31, No. 3, Mar. 2009, pp. 492-504.

Banno, Atsuhiko et al., "Disparity Map Refinement and 3D Surface Smoothing via Directed Anisotropic Diffusion", IEEE 12th International Conference on Computer Vision Workshops, 2009, pp. 1870-1877.

Hirschmuller, Heiko et al., "Accurate and Efficient Stereo Processing by Semi-Global Matching and Mutual Information", IEEE Conference on Computer Vision and Pattern Recognition, Jun. 20-26, 2005, pp. 807-814.

Kolmogorov, Vladimir et al., "Multi-Camera Scene Reconstruction via Graph Cuts", Computer Science Department, Cornell University, pp. 1-16.

Wersing, Heiko et al., "Online Learning of Objects in a Biologically Motivated Visual Architecture", International Journal of Neural Systems, vol. 17, No. 4, 2007, pp. 219-230.

Oniga, Florin et al., "Road Surface and Obstacle Detection Based on Elevation Maps from Dense Stereo", Proceedings of the 2007 IEEE Intelligent Transportation Systems Conference, Sep. 30-Oct. 3, 2007, pp. 859-865.

Hirschmuller, Heiko et al., "Real-Time Correlation-Based Stereo Vision with Reduced Border Errors", Draft for the International Journal of Computer Vision, 2002, pp. 229-246.

Birchfield, Stan et al., "A Pixel Dissimilarity Measure That is insensitive to Image Sampling", IEEE Transactions on Pattern Analysis and machine Intelligence, vol. 20, No. 4, Apr. 1998, pp. 401-406.

Hirschmuller, Heiko et al., "Evaluation of Cost Functions for Stereo Matching", IEEE Computer Society Conference on Computer Vision and Pattern Recognition, 2007, pp. 1-8.

Zabih, Ramin et al., "Non-Parametric Local Transforms for Computing Visual Correspondence", In Proceedings of European Conference on Computer Vision, May 1994, pp. 151-158.

Scharstein, Daniel et al., "A Taxonomy and Evaluation of Dense Two-Frame Stereo Correspondence Algorithms", International Journal of Computer Vision 47, 2002, pp. 1-35.

Fua, Pascal "A Parallel Stereo Algorithm that Produces Dense Depth Maps and Preserves Image Features", Machine Vision and Applications, 1993, pp. 35-49.

Hirschmuller, Heiko et al., "Evaluation of Stereo Matching Costs on Images with Radiometric Differences", IEEE Transactions on Pattern Analysis and Machine Intelligence, 2009, pp. 1582-1599.

* cited by examiner

TWO-STAGE CORRELATION METHOD FOR CORRESPONDENCE SEARCH

INTRODUCTION

The invention generally relates to the field of processing images, including videos, from a stereo camera. The invention especially relates to the estimation and/or search of correspondences between different images. One prominent example is the correspondence search between the left and right stereo image of a stereo camera system, which directly relates to the depth and/or distance of an object, i.e. the distance from a plane interconnecting the stereo cameras to an object present in the input field of both stereo cameras.

The computation of stereoscopic depth is an important field of computer vision. Although several algorithms have been developed, the traditional correlation based versions of these algorithms are prevalent. This is mainly due to easy implementation and handling but also due to low computational complexity, as compared to more elaborated algorithms' based on diffusion processes and/or graph-cut. In the following, a new two-stage matching cost is introduced for the traditional approach: the summed normalized cross-correlation (SNCC). This new cost function performs a normalized cross-correlation in the first stage and aggregates the correlation values in a second stage. It is shown that this new measure can be implemented efficiently and that it leads to a substantial improvement of the traditional stereo approach performance because it is less sensitive to high contrast outliers. Moreover, it is shown that this improvement makes the traditional method compete with state-of-the-art approaches.

BACKGROUND

Stereo processing is one of the most intensively researched areas in computer vision. Over the last three decades a large amount of different approaches have been developed. Current state-of-the-art approaches are based on belief propagation [1, 2], dynamic programming [3, 4] or graph-cut [5].

However, the traditional correlation based stereo image processing is still a common tool, especially in real-time systems [6-8]. A major drawback of the traditional stereo processing approach is that depth discontinuities are blurred more than in state-of-the-art approaches. The degree of blurring depends on the matching costs used for correlating image patches. The most common matching costs for traditional stereo processing are the sum of absolute difference (SAD) and the sum of squared difference (SSD). These measures assume a constant intensity for corresponding pixels, i.e. the color or gray values are the same for corresponding pixels in the left and right image. For this reason they often fail in real-world applications due to lighting changes between the two camera views. A common way for reducing this effect is to apply a Laplacian of Gaussian filter or to subtract the mean intensity in each image prior to the actual stereo computation. Furthermore, SAD and SSD can produce bad correlation values for corresponding pixels. To compensate for this, Birchfield and Tomasi have proposed a sampling-insensitive calculation [9]. However, comparisons [10] have shown that despite these countermeasures, SAD and SSD are inferior to other matching costs that account directly for changes in intensity.

One of the standard matching costs that accounts for changes in intensity is the normalized cross-correlation (NCC). It allows for a bias and a linear gain of pixel intensities. Furthermore, NCC is optimal for compensating Gaussian noise and the correlation values are constrained to the interval of [−1,1], which eases the selection of a threshold for rejecting bad matches. The main disadvantage of NCC is the strong blurring at depth discontinuities compared to other matching costs.

Two other important cost functions are "rank" and "census transform" [11]. The main idea of "rank transform" is to replace each pixel intensity with its rank among a certain neighborhood. This removes most of the lighting changes that can occur between images and decreases the blurring of depth edges compared to the other cost functions. The actual rank transform is only a preprocessing of the stereo images, which is usually followed by a stereo computation with SAD or SSD. In a comparison of six cost functions in [10], rank transform was shown to be the best cost function for correlation based stereo with respect to several radiometric changes.

The "census transform" is an extension of the rank transform which does not replace the pixels with their rank but rather a binary fingerprint that encodes which pixels of the neighborhood are smaller than an anchor pixel. The matching cost here is the hamming distance between two such finger prints.

In the following it is discussed why the normalized cross-correlation (NCC) is prone to blur depth at discontinuities stronger than other matching costs and why the summed normalized cross-correlation abates this problem. Furthermore, it is shown that NCC and SNCC can be implemented efficiently using box filters.

Problem of Normalized Cross-Correlation (NCC)

For two patches from two camera images $I^L$ (left) and $I^R$ (right) the normalized cross-correlation (NCC) is defined as:

$$\rho_x = \frac{\frac{1}{|p(x)|}\sum_{x' \in p(x)}(I^L_{x'} - \mu^L_x)(I^R_{x'+d} - \mu^R_{x+d})}{\sigma^L_x \sigma^R_{x+d}}, \quad (1)$$

where $$\mu_x = \frac{1}{|p(x)|}\sum_{x' \in p(x)} I_{x'}, \quad \sigma_x = \sqrt{\frac{1}{|p(x)|}\sum_{x' \in p(x)}(I_{x'} - \mu_x)^2}. \quad (2)$$

In the above equations x is the pixel position of the anchor point of the left patch, p(x) is the set of pixel coordinates of the left image patch and p(x+d) is the set of pixel coordinates of the right image patch, i.e. d denotes the disparity between the left and right image patch. Furthermore, |p(x)| is the number of elements of p(x).

As was stated above NCC tends to blur depth at discontinuities. The reason for this is that depth discontinuities often exhibit a strong contrast and the correlation value is influenced most by the strongest contrast. This effect is due to the normalization. In each patch p(x) the values are normalized by $$I^{norm}_{x'} = \frac{I_{x'} - \mu_x}{\sigma_x}, \text{ where } x' \in p(x). \quad (3)$$

Because of this normalization the low contrast structure in the vicinity of a high contrast edge is suppressed. To visualize this, a very high contrast rectangle (value 10000) is added to the left Venus image of the Middlebury stereo benchmark [12]. Then the normalization equation (3) is applied to this image using different filter sizes or patch sizes. The resulting images of the filtering are shown in FIG. 1. They demonstrate that the high contrast rectangle suppresses the structure in its surrounding, whose size is defined by the patch size.

Due to this suppression effect all patches in the vicinity of a high contrast edge favor the disparity of this edge because it is the dominant structure. Not fitting this structure would lead to a large error or small correlation value. In FIG. 2a a cutout of the left image of the Venus scene is shown. The white rectangle patch is correlated with the right image, shown in FIG. 2b, for several disparities (shifts). FIG. 2c shows the correlation values for these disparities. This plot shows that the best match is roughly at 13 pixel disparities while the ground truth depth is roughly at 8 pixel disparities (depicted by the horizontal line). The patch that corresponds to the peak is depicted as the solid rectangle in FIG. 2b. The reason for this wrong match is the large contrast edge between the bright newspaper and the dark background. As the newspaper has roughly a disparity of 13 pixels all patches that encompass the border of the newspaper will have the best correlation at 13 pixels disparity.

In summary the above observations demonstrate that the normalized cross-correlation is biased by strong contrasts. This leads to the conclusion that NCC for stereo processing should be used with small patch sizes. However, decreasing the patch size would lead to noisy depth images.

The blurring effect of NCC hence arises from its sensitivity to high contrasts. The invention therefore presents a new two-stage correlation that reduces this sensitivity. In the first stage a normalized cross-correlation is computed using a small patch size followed by a summation of the correlation coefficient in the second stage. It is shown that this summed normalized cross-correlation (SNCC) dramatically improves the results of traditional stereo algorithms compared to plain NCC and also the powerful rank transform.

SUMMARY OF THE INVENTION

This object is achieved by a method and a system according to the independent claims. Advantageous embodiments are defined in the dependent claims.

In one embodiment, the invention presents a computer-implemented method for comparing the similarity between two image patches taken from a stereo camera system, preferably in order to compute a depth estimation value for an object in the input field of a stereo camera, the method comprising the steps of: receiving from at least two vision sensors, such as e.g. a stereo camera, at least two image patches, wherein each sensor supplies an image patch, and comparing the received image patches by: extracting a number of corresponding subpart pairs from each image patch, calculating a normalized local similarity score between all corresponding subpart pairs, calculating a total matching score by integrating the local similarity scores of all corresponding subpart pairs, and using the total matching score as an indicator for an image patch similarity, determining corresponding similar image patches based on the total matching score.

In another embodiment, the invention presents a computer-implemented method for comparing the similarity between image patches, the method comprising the steps of: receiving from at least two image sources, such as e.g. a stereo camera, at least two image patches, wherein each source supplies at least one image patch, and comparing the received image patches by: extracting a number of corresponding subpart pairs from each image patch, calculating a normalized local similarity score between all corresponding subpart pairs, calculating a total matching score by integrating the local similarity scores of all corresponding subpart pairs, and using the total matching score as an indicator for an image patch similarity.

The subparts of each image patch can overlap.

The normalized similarity score may be calculated using normalized cross-correlation (NCC) or weighted NCC (using a weighted window), comprising the steps of calculating mean and standard deviation for each subpart, and calculating a normalized cross-correlation coefficient.

An image patch can be compared to a list of other patches in order to find the most similar image patch in the list.

The at least two image sources may be at least two cameras and the image patches from one camera image are compared to the patches from the other camera image in order to find corresponding image patches.

A disparity-based depth value can be estimated using the calculated patch similarity.

The image patches may be extracted from a camera or cameras mounted on a robot or a car.

A normalized local similarity score can be calculated by a NCC matching providing local matching measures, and wherein the total matching score may be calculated using the local measures and wherein the total matching score calculation suppresses noise that arises from the local calculation.

The total matching score may be calculated from averaging, weighted averaging, winner-takes-all selection or a median selection of the local matching scores.

The image patches can be arbitrary data vectors. The image patches may consist of discrete elements with numerical values.

The numerical values of the discrete elements can represent gray-scaled pixel values.

The image patches may consist of multiple layers or multiple dimensions.

The image patches can be RGB image patches.

The at least two image sources may be images from one camera at distinct points in time.

The image patches from a time can be compared to the image patches of another point in time in order to find corresponding image patches.

The calculated patch similarity may be used for image patch-based motion estimation.

One vision image source can be a template image patch depicting an object, wherein the template image patch is loaded from a database and/or memory and wherein the template image patch can be compared to extracted image patches from the second or another image source in order to find an object in the image.

The template image patch may be acquired beforehand.

The method can be embedded into a system with a temporal framework of repetitive prediction and confirmation as used in a tracking method, in order to track an object over time, thereby restricting the similarity computation to a selected set of patches gained using a prediction function that formalizes this selection.

The averaging and filtering operations may be optimized, e.g. using separable filters or box filter methods.

In another embodiment, the invention provides a robot or land, air, sea or space vehicle equipped with a system, especially a depth estimation, motion estimation, object detection or object tracking system, performing the method according to any one of the preceding claims, the system comprising at least one camera, in particular for depth estimation a stereo camera, and a computing unit.

In yet another embodiment, the invention provides a vehicle with a driver assistance system performing the method described above in order to compute a depth estimation value for at least one object in the input field of a stereo camera of the vehicle.

In still another embodiment, the invention provides a computer program product performing, when executed on a computer the method described above.

The sensors can be at least two cameras and the image patches from one camera image are compared to the patches from the other camera image in order to find corresponding image patches.

In another embodiment, the invention presents a method for comparing the similarity between image patches comprising the steps of receiving from a sensor at least two image patches, wherein each image patch is extracted at a distinct point in time, comparing the received image patches by extracting a number of corresponding subpart pairs from each image patch, calculating a normalized local similarity score between all corresponding subpart pairs, calculating a total matching score by integrating the local similarity scores of all corresponding subpart pairs, and using the total matching score as an indicator for an image patch similarity, determining corresponding similar image patches based on the total matching score.

The image patches can be extracted from a moving camera at two distinct points in time and wherein the image patches from one time may be compared to the image patches of the other point in time in order to find corresponding image patches.

The calculated patch similarity can be used for image patch-based motion estimation.

In a further embodiment, the invention presents a method for comparing the similarity between a template image patch depicting an object and image patches from a sensor comprising the steps of receiving from a sensor at least one image patch, comparing the received image patch with the template patch by extracting a number of corresponding subpart pairs from the template and the sensor image patch, calculating a normalized local similarity score between all corresponding subpart pairs, calculating a total matching score by integrating the local similarity scores of all corresponding subpart pairs, and using the total matching score as an indicator for an image patch similarity, determining image patches corresponding to the template patch based on the total matching score in order to find the template object in the image. The template image is loaded from some database or memory and was acquired beforehand by other means.

The method can be embedded into a system with a temporal framework in order to track an object over time, thereby restricting the similarity computation to a small set of patches predicted by the temporal framework.

In yet another embodiment, the invention presents a robot or autonomous vehicle equipped with a system performing the method as described herein.

Further embodiments and functionalities of the invention will become apparent from the following description and drawings.

DETAILED DESCRIPTION OF THE INVENTION

To overcome the aforementioned dilemma of NCC filtering, a two-stage filtering is disclosed.

Figure 6:
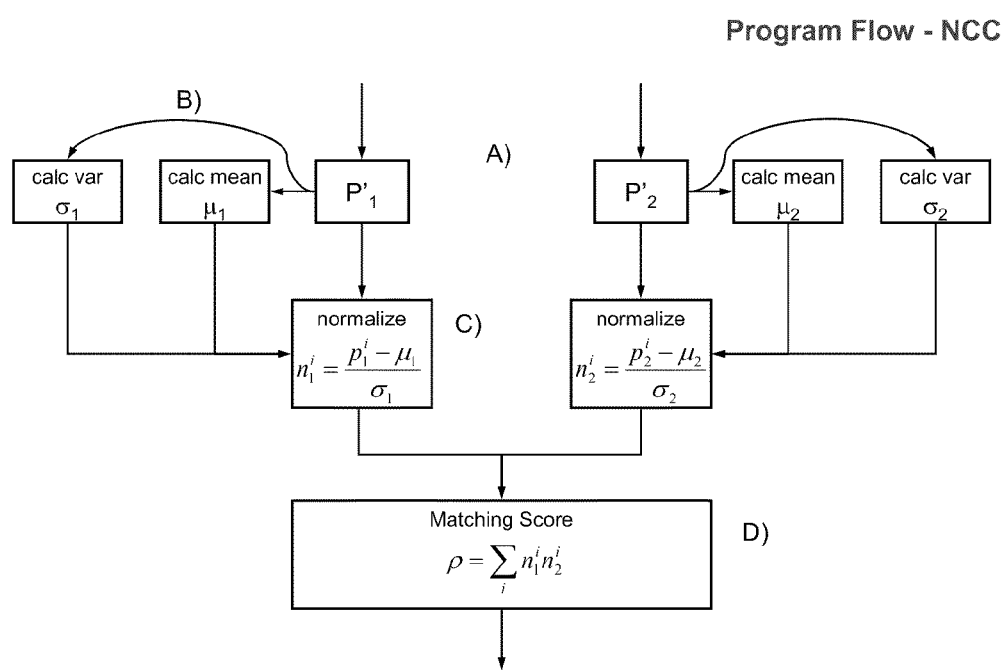
FIG. 6: Processing flow of NCC for two image patches $P_1$ and $P_2$. First the mean and standard deviation is calculated for each patch. Then the patch values are normalized using mean and standard deviation. Finally, a matching score is computed.
Figure 7:
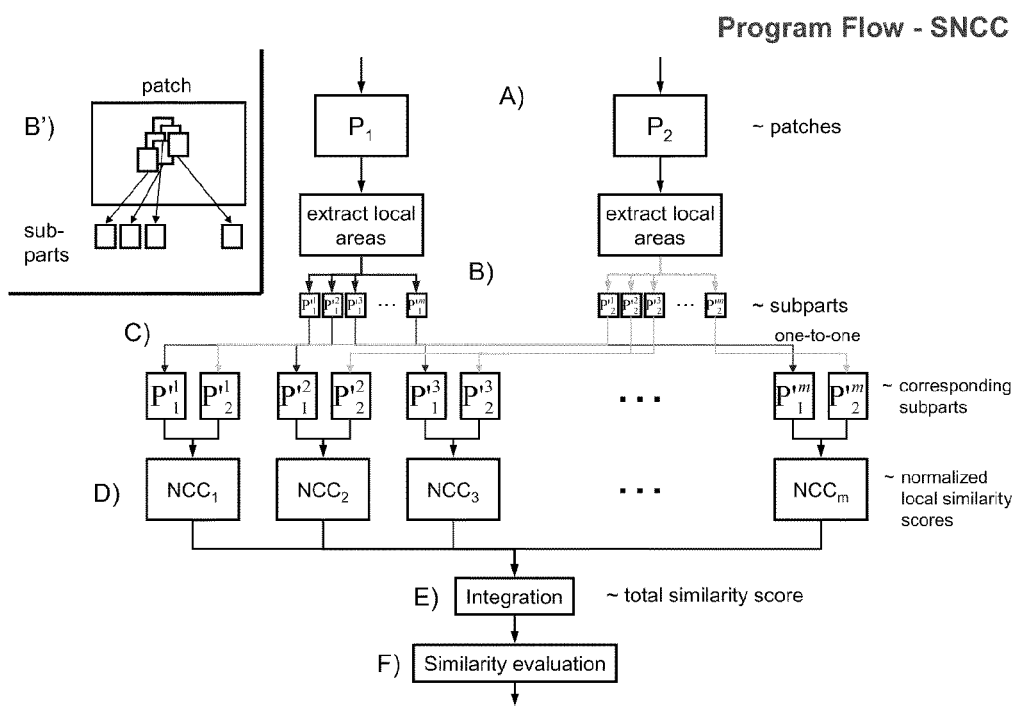
FIG. 7: Processing flow of SNCC for two image patches $P_1$ and $P_2$. First corresponding subparts are extracted from the image patches. As depicted in the upper left the subparts may be overlapping. Secondly, NCC is calculated for all subpart pairs in order to get local similarity scores. Finally, an integration of the local similarity scores leads to the total matching score of the input patches.

The processing of the two-stage filtering called "Summed Normalized Cross-Correlation" (SNCC) is shown in FIG. 7. In a first step, the image patches (A) are divided into subparts (B). As is depicted in the inset (B') at the upper left of FIG. 7 these subparts may also overlap. Furthermore, the two patches are subdivided in an analogous way, so that each subpart in one patch has a corresponding subpart in the other patch (C). In a second step, each corresponding subpart pair is passed toward the NCC calculation (D). Each NCC box in FIG. 7 can be replaced by the scheme shown in FIG. 6. This leads to local similarity scores for each subpart pair. These scores are integrated into a total matching score in a third step (E), which finally leads to the similarity evaluation (F).

The integration can be done in several ways. The most simple form is an averaging of the local matching scores. This averaging could be governed by weights leading to a weighted averaging. Other methods comprise a winner-takes-all scheme, i.e. selecting the best local score, or a median selection, i.e. sorting the local scores and selecting the midmost. Furthermore, the integration can be any function that computes a total score from the set of local scores.

As mentioned above, FIG. 6 displays the working of the NCC-part of the proposed invention. Given two corresponding subparts $P'_1$ and $P'_2$ (A), first the mean value and the standard deviation within each subpart are calculated (B). Next, the values within the subparts are normalized by subtracting the mean value and dividing by the standard deviation (C). Finally, a pixel-wise multiplication followed by an averaging summation leads to the local matching score, which describes the similarity of the subpart pair (D).

For the NCC modules a very small subpart size, e.g. squared sub-patches of 3×3 or 5×5, is used. In doing so, the fine structure of the image is preserved and the integration step reduces the noise in the estimation. This means that the new similarity score function is defined as $$\bar{\rho}_x = \frac{1}{|p'(x)|} \sum_{x'' \in p'(x)} \rho x'', \quad (4)$$

where $\rho_{x''}$ is defined by the correlation equation (1) and p'(x) is the set of pixel coordinates of the summation filter.

Figure 1:
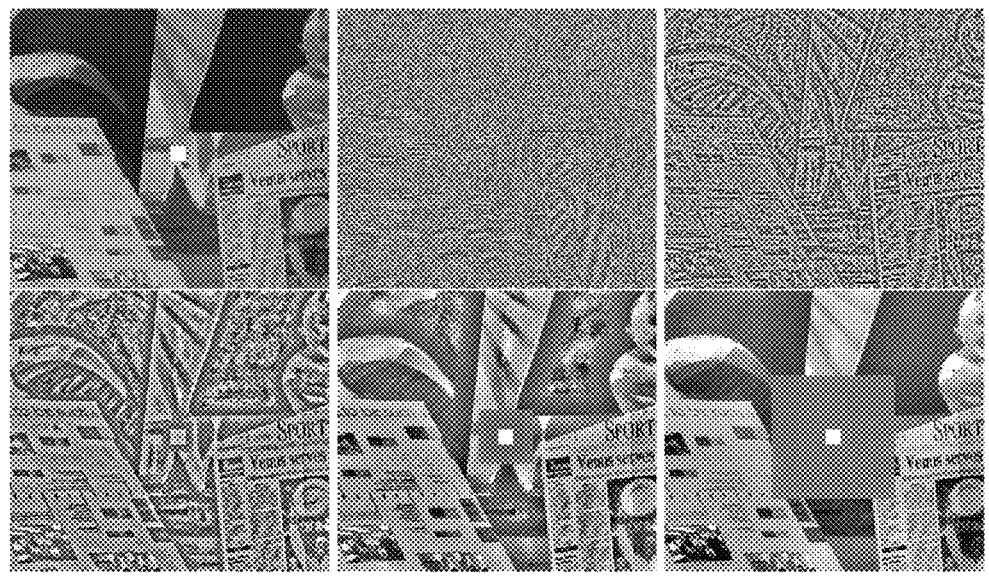
FIG. 1: The top left image shows the left Venus image altered by a rectangle of very high contrast. From top middle to bottom right mean and standard deviation normalized images are show using filter sizes of 3, 9, 21, 55, 149. Especially, for the larger filter sizes the suppression of the neighborhood of the high contrast rectangle is clearly observable.
Figure 2:
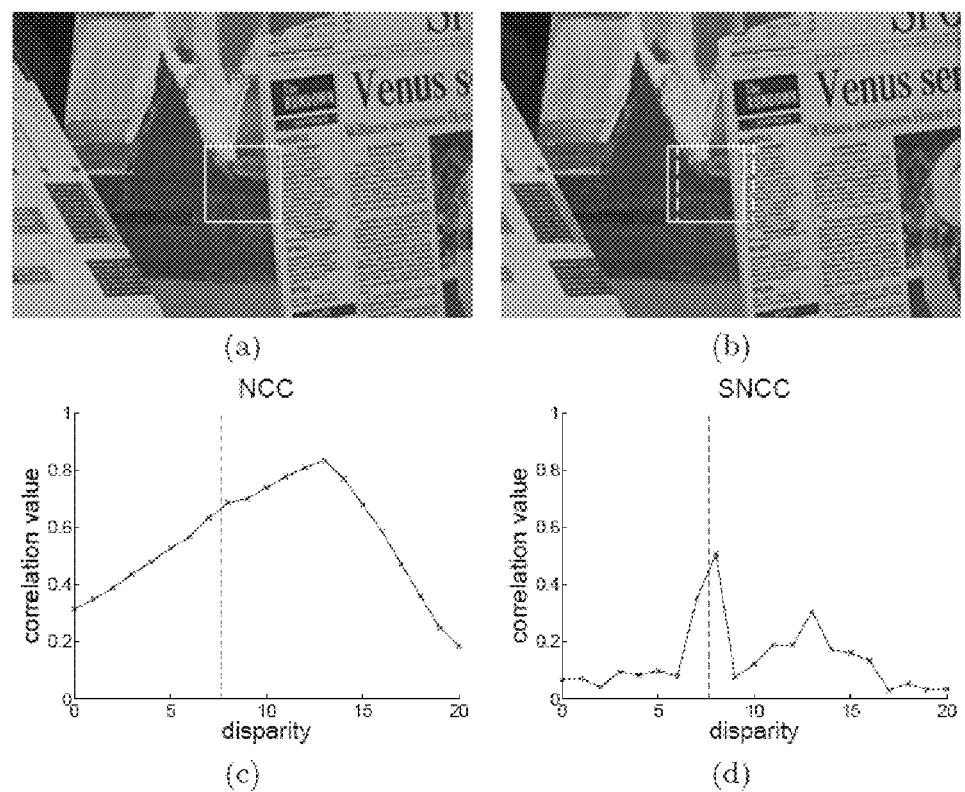
FIG. 2: a) and b) show a cutout of the left and the right stereo image of the Venus scene. The rectangular patch in a) is correlated with the right image for a set of disparities. In this case, the disparity is the relative x-displacement of the compared patches c) and d) show the results for NCC and SNCC, respectively. Correspondingly, the best matching patches are depicted in b) by the solid rectangle for NCC and the dashed rectangle for SNCC. The vertical line in c) and d) denotes the ground truth disparity.

The new matching cost is applied to the patch from FIG. 2a using subparts of size, e.g., 3×3 for the NCC stage. Comparing these correlation values (FIG. 2d) with the results of the standard NCC (FIG. 2c) demonstrates the improvement. With the new SNCC measure the influence of the strong contrast edge is dramatically reduced, though it is still visible by the second peak. The best matching patch for SNCC is depicted by the dashed rectangle in FIG. 2b. It can be seen that this corresponds much better to the target patch than the best matching patch of NCC (solid rectangle).

Computational Complexity

The computational complexity of a traditional stereo processing with summed normalized cross-correlation is O(nd), where n is the number of pixels and d the number of disparities. This becomes possible by using box filters for calculating the normalized cross-correlation and the summation. In order to explain how box filters can be used for the NCC Filtering first the correlation equation (1) is rewritten to $$\rho_x = \frac{\frac{1}{|p(x)|} \sum_{x' \in p(x)} (I^L_{x'} I^R_{x'+d}) - \mu^L_x \mu^R_{x+d}}{\sigma^L_x \sigma^R_{x+d}}. \quad (5)$$

This shows that the means and standard deviations can be computed in advance for both the left and the right stereo image. What remains for each disparity is the summation term in the above equation. For this summation a box filter can be applied if the same was done for the means and standard deviations in the pre-computation phase. The summation of correlation values in the second stage of the SNCC is also done by means of box filters.

Altogether the calculation of the matching cost of one pixel for one disparity takes six multiplications, four additions and five subtractions (not including the pre-computation phase). Due to the box filters these numbers of operations are independent of the used filter sizes. However, the benefits of the proposed method apply equally for arbitrary, non-box-like patch definitions.

Figure 3:
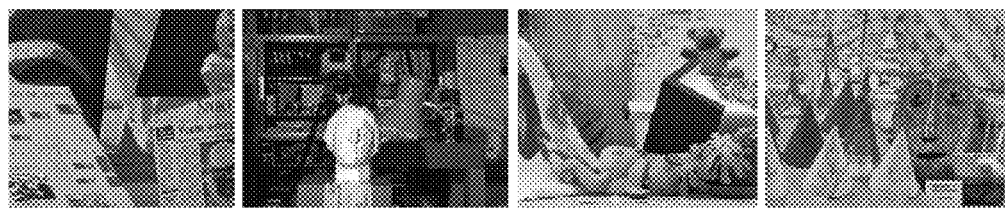
FIG. 3: The left stereo images of the Venus, Tsukuba, Teddy and Cones scene.
Figure 5:
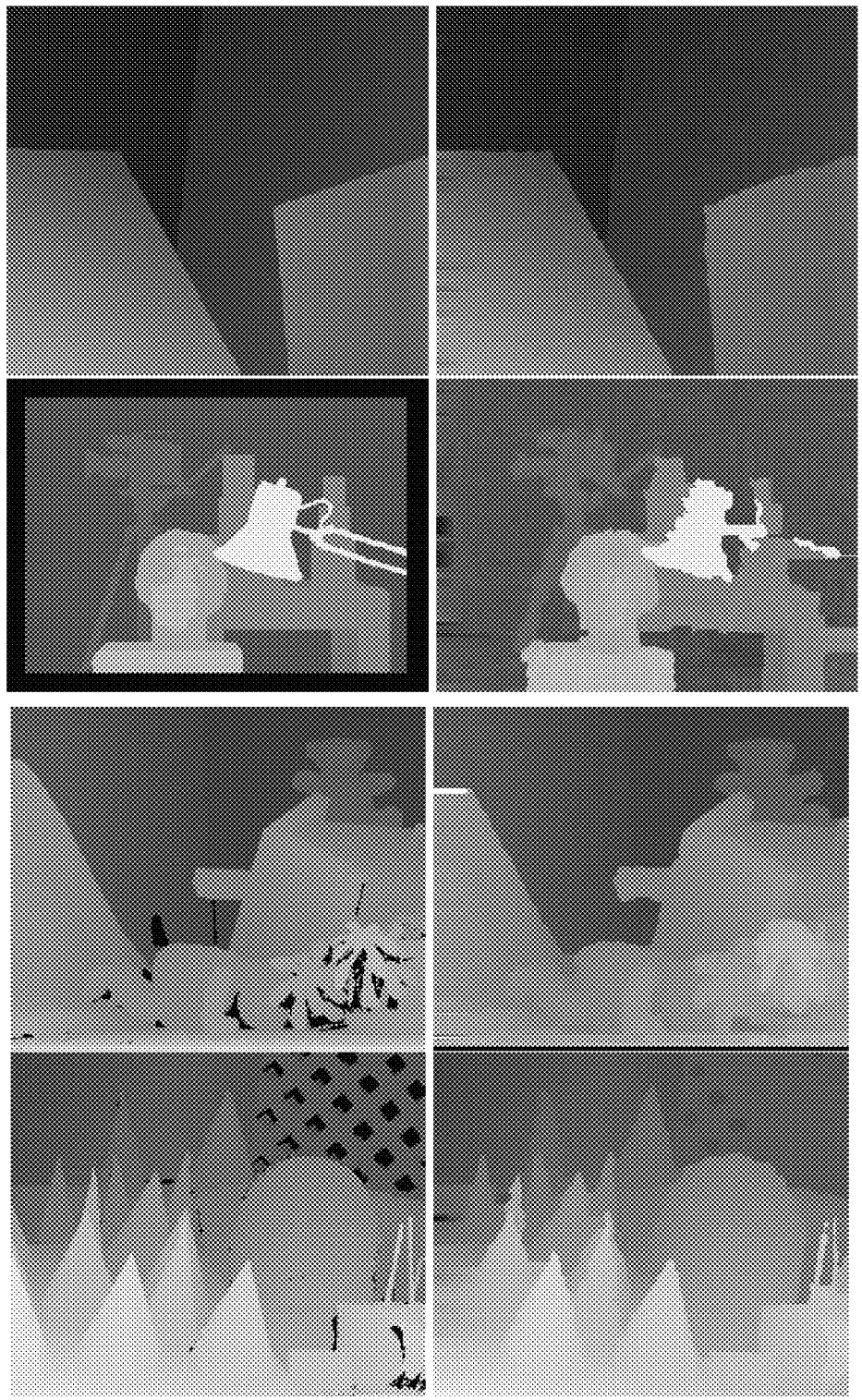
FIG. 5: From top to bottom these are disparity maps of the Venus, Tsukuba, Teddy and Cones scene. The left column shows the ground truth depth data and the right column the result of the proposed SNCC for traditional stereo. Intensity encodes the depth. Near pixels are bright and far pixels are dark.

For evaluating our new invention, it was applied to depth estimation by means of a stereo camera setup. Here the Middlebury Stereo Depth benchmark images (see FIG. 3) were used. For a visual comparison, FIG. 5 depicts the disparity maps (right column) together with the ground truth maps (left column). The quality of the disparity maps is very good which again highlights the improvements that can be achieved using SNCC.

Figure 4:
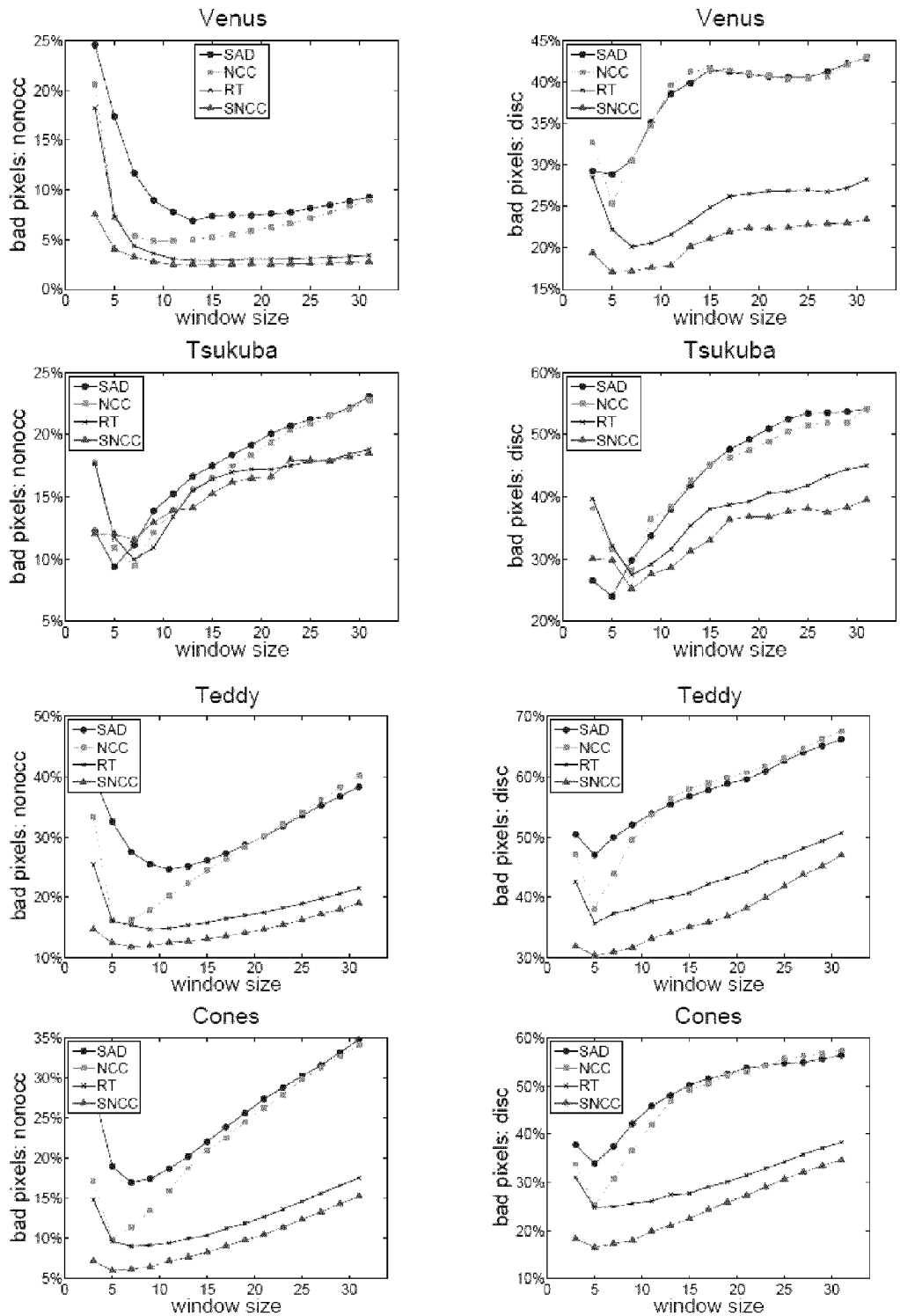
FIG. 4: This figure shows the performance of the traditional stereo for the non-occluded (nonocc) and depth discontinuity (disc) areas of interest in the left and the right column, respectively. The plots show the percentage of bad pixels against the patch window size for the proposed two-stage matching SNCC compared to SAD, NCC and RT.

This invention presents the summed normalized cross-correlation (SNCC), a cost function for the traditional stereo image computation. It is a two-stage approach that performs a normalized cross-correlation (NCC) with a very small filter in the first stage and aggregates the resulting correlation coefficients in the second stage. This two-stage processing reduces the blurring of depth discontinuities which NCC is usually prone to. These considerations are confirmed by means of experimental results. By comparing the SNCC method with common cost functions (see table below and FIG. 4), it is shown that SNCC significantly improves the results of the traditional stereo approach.

|  | Venus | | | Tsukuba | | | Teddy | | | Cones | | |
| --- | --- | --- | --- | --- | --- | --- | --- | --- | --- | --- | --- | --- |
| cost | noocc | all | disc | noocc | all | disc | noocc | all | disc | noocc | all | disc |
| SAD | 7.75 | 8.64 | 38.6 | 15.25 | 16.67 | 38.07 | 24.66 | 29.69 | 53.82 | 18.69 | 25.38 | 45.81 |
| NCC | 5.32 | 6.3 | 30.5 | 9.45 | 10.63 | 28.09 | 16.27 | 21.48 | 43.92 | 11.4 | 18.55 | 30.78 |
| RT | 3.61 | 4.54 | 20.56 | 10.91 | 11.96 | 29.16 | 14.69 | 20.83 | 38.10 | 9.17 | 16.16 | 25.58 |
| SNCC | 3.25 | 4.06 | 17.18 | 11.55 | 12.58 | 25.23 | 11.77 | 16.86 | 30.88 | 6.20 | 13.11 | 17.25 |

Furthermore, it is shown that SNCC can be implemented very efficiently using box filters. By doing so, stereo maps are computed in O(nd). It should be noted that the SNCC measure could also improve the traditional optical flow algorithms as this is closely related to stereo calculations. Moreover, the idea behind SNCC could be used in any application that uses NCC and suffers from the fact that NCC fails in the presence of high contrast outliers. For example, visual tracking or object detection could also benefit from this new cost function.

Further Embodiments

The proposed SNCC can be used in an analogous way for motion estimation between camera images of different time steps. The difference to stereo processing is that corresponding image patches are not constrained to a horizontal shift but that corresponding image patches can shift arbitrarily from one camera image to the other. This leads to a larger number of image patches to compare but the overall method is the same.

The proposed SNCC can be used in an analogous way for object detection by means of a template patch depicting the object. This template patch is loaded from some database or memory and was acquired beforehand by other means. The difference to stereo processing is that not image patches from different images are compared but that image patches from an image are compared to a template patch depicting the object. However, the processing of SNCC for calculating the similarity scores is the same.

The proposed SNCC can be used in an analogous way for object tracking in a temporal framework. Such frameworks keep track of an objects position, velocity or also higher motion parameters either in a certain coordinate system, e.g. camera relative coordinates or world coordinates. From these motion parameters of the object the position of the object for a following point in time can be predicted. Furthermore, temporal tracking frameworks also keep track of the appearance of the object, e.g. in terms of an image template. In order to keep the motion parameters and the object template up to date, it needs to confirm and refine the predictions made based on the currently known object motion parameters. To this end, a set of image patches around the predicted position has to be compared to the current object template. The best matching image patch is used by the temporal framework to update the motion parameters and the object template.

SUMMARY

Normalized Cross-Correlation (NCC) is a standard matching criterion for many applications (Stereo-Computation, Motion-Computation, Tracking, General Pattern-Matching, etc.)

NCC calculates a matching score r between two patterns $P_1$ and $P_2$. It has an build-in invariance to a bias and a linear gain.

For larger patterns to match, NCC tends to take high contrasts structures more into account than low-contrast structures.

This often leads to wrongly good/bad matches if only the high contrast structure matches/matches not, although low-contrast structure does not match/match.

In particular, only a small percentage of high contrast structures is necessary to lead to such aforementioned miss-matching.

The problem of NCC is solved by applying a two-stage matching.

For two patterns to match, we decompose the matching process in a local and global process.

The local process is governed by the NCC matching which gives local matching measures. These local measures are still prone to the same high contrast problem mentioned before, but the effect is restricted to the local areas. The local areas could be a partitioning of the patterns or also overlapping areas.

The global process takes the local measures into account in order to calculate the actual matching score. This could be done by averaging, winner-takes-all selection or median selection. The global process suppresses noise that arises from the local process.

The two-stage matching removes the problem of high contrast structures because it leads to an equal contribution of all elements to the matching score.

Rank-order coding also tries to reduce the effect of high contrast structures for large patterns, however, it functions in a complete different way that is not related to NCC.

Although the claims refer to image patches in the claims, the same is also true for arbitrary data vectors.

A data vector/image patch consists of discrete elements with numerical values, e.g. gray-scaled pixel values.

Furthermore, an image patch can also consist of multiple layers or multiple dimensions, e.g. RGB image patch.

The subpart of an image patch or data vector is a subset of the elements of the image patch or data vector.

PRIOR ART REFERENCES

1. Yang, Q., Wang, L., Yang, R., Stewenius, H., Nister, D.: Stereo matching with color-weighted correlation, hierarchical belief propagation, and occlusion handling. IEEE Transactions on Pattern Analysis and Machine Intelligence 31 (2008) 492-504
2. Banno, A., Ikeuchi, K.: Disparity map refinement and 3d surface smoothing via directed anisotropic diffusion. In: 3-D Digital Imaging and Modeling. (2009) 1870-1877
3. Hirschmüller, H.: Accurate and efficient stereo processing by semi-global matching and mutual information. In: IEEE Computer Society Conference on Computer Vision and Pattern Recognition. (2005) II: 807-814
4. Deng, Y., Lin, X.: A fast line segment based dense stereo algorithm using tree dynamic programming. In: ECCV. (2006) III: 201-212
5. Kolmogorov, V., Zabih, R.: Multi-camera scene reconstruction via graph cuts. In: European Conference on Computer Vision. (2002) III: 82-96
6. Wersing, H., Kirstein, S., Goetting, M., Brandl, H., Dunn, M., Mikhailova, I., Goerick, C., Steil, J. J., Ritter, H., Koerner, E.: Online learning of objects in a biologically motivated visual architecture. International Journal of Neural Systems 17 (2007) 219*230
7. Oniga, F., Nedevschi, S., Meinecke. M., To, T. B.: Road surface and obstacle detection based on elevation maps from dense stereo. In: IEEE Intelligent Transportation Systems Conference. (2007) 859-865
8. Hirschmüller, H., Innocent, P. R., Garibaldi, J. M.: Real-time correlation-based stereo vision with reduced border errors. International Journal of Computer Vision 47 (2002) 229-246
9. Birchfield, S., Tomasi, C.: A pixel dissimilarity measure that is insensitive to image sampling. IEEE Transactions on Pattern Analysis and Machine Intelligence 20 (1998) 401-406
10. Hirschmüller, I-I., Scharstein. D.: Evaluation of cost functions for stereo matching. In: IEEE Computer Society Conference on Computer Vision and Pattern Recognition. (2007)
11. Zabih, R., Woodfill, J.: Non-parametric local transforms for computing visual correspondence. In: Proceedings of ECCV. (1994) 151-158
12. Scharstein, D., Szeliski, R.: A taxonomy and evaluation of dense two-frame stereo correspondence algorithms. International Journal of Computer Vision 47 (2002) 7-42
13. Fua, P.: A parallel stereo algorithm that produces dense depth maps and preserves image features. Machine Vision and Applications 6 (1993) 35-49
14. Hirschmüller, H., Scharstein, D.: Evaluation of stereo matching costs on images with radiometric differences. PAMI 31 (2009) 1582-1599

The invention claimed is:

1. A computer-implemented method for comparing the similarity between two image patches taken from a stereo camera system, the method comprising the steps of:
   receiving from at least two vision sensors at least two image patches, wherein each sensor supplies an image patch, and
   comparing the received image patches by:
   extracting a plurality of corresponding subpart pairs from each image patch, by subdividing the two image patches in an analogous way into subparts, so that each subpart in one of the two image patches has a corresponding subpart in the other image patch,
   calculating a normalized local similarity score between all corresponding subpart pairs,
   calculating a total matching score by integrating the normalized local similarity scores of all corresponding subpart pairs, and
   using the total matching score as an indicator for an image patch similarity,
   determining corresponding similar image patches based on the total matching score.

2. The method according to claim 1, wherein the at least two vision sensors comprises a stereo camera.

3. A computer-implemented method for comparing the similarity between image patches, the method comprising the steps of:
- receiving from at least two image sources at least two image patches, wherein each sensor supplies at least one image patch, and
- comparing the received image patches by:
- extracting a plurality of corresponding subpart pairs from each image patch, by subdividing the two image patches in an analogous way into subparts, so that each subpart in one of the two image patches has a corresponding subpart in the other image patch,
- calculating a normalized local similarity score between all corresponding subpart pairs,
- calculating a total matching score by integrating the normalized local similarity scores of all corresponding subpart pairs, and
- using the total matching score as an indicator for an image patch similarity.

4. The method according to claim 3, wherein the subparts of each image patch are overlapping.

5. The method according to claim 3, wherein the normalized local similarity score is calculated using normalized cross-correlation (NCC) and/or weighted NCC (using a weighted window), comprising the steps of
- calculating mean and standard deviation for each subpart, and
- calculating a normalized cross-correlation coefficient.

6. The method according to claim 3, wherein an image patch is compared to a list of other patches in order to find the most similar image patch in the list.

7. The method according to claim 3, wherein the at least two image sources are at least two cameras and the image patches from one camera image are compared to the patches from the other camera image in order to find corresponding image patches.

8. The method according to claim 7, wherein the at least two cameras comprises a stereo camera.

9. The method according to claim 3, wherein a disparity-based depth value is estimated using the calculated image patch similarity.

10. The method according to claim 3, wherein the image patches are extracted from a camera or cameras mounted on a robot or a car.

11. The method according to claim 3, wherein
- the normalized local similarity score is calculated by a NCC matching providing local matching measures, and wherein
- calculating the total matching score uses the local measures and wherein the total matching score calculation suppresses noise that arises from the local calculation.

12. The method according to claim 3, wherein the total matching score is calculated from averaging, weighted averaging, winner-takes-all selection and/or a median selection of a local matching scores.

13. The method according to claim 3, wherein the image patches are arbitrary data vectors.

14. The method according to claim 3, wherein the image patches consist of discrete elements with numerical values.

15. The method according to claim 14, wherein the numerical values of the discrete elements represent gray-scaled pixel values.

16. The method according to claim 3, wherein the image patches consist of multiple layers and/or multiple dimensions.

17. The method according to claim 3, wherein the image patches are RGB image patches.

18. The method according to claim 3, wherein the at least two image sources are images from one camera at distinct points in time.

19. The method according to claim 18, wherein the image patches from one time are compared to the image patches of another point in time in order to find corresponding image patches.

20. The method of claim 3, wherein the calculated image patch similarity is used for image patch-based motion estimation.

21. The method according to claim 3, wherein one image source is a template image patch depicting an object, wherein the template image patch is loaded from a database and/or memory, and wherein the template image patch is compared to extracted image patches from the second and/or another image source in order to find an object in the image.

22. The method according to claim 3, wherein the method is embedded into a system with a temporal framework of repetitive prediction and confirmation as used in a tracking method, in order to track an object over time, thereby restricting the similarity computation to a selected set of patches gained using a prediction function that formalizes this selection.

23. The method of claim 3, wherein an averaging and filtering operations are optimized via separable filters and/or box filter methods.

24. A robot or land, air, sea or space vehicle equipped with a system, including a depth estimation, motion estimation, object detection and/or object tracking system, performing the method according to claim 3, the system comprising at least one camera configured for depth estimation and a computing unit.

25. The method according to claim 24, wherein the at least one camera comprises a stereo camera.

26. A vehicle with a driver assistance system performing the method according to claim 3 in order to compute a depth estimation value for at least one object in the input field of a stereo camera of the vehicle.

27. A computer program product embodied on a non-transitory computer-readable medium, said computer program product comprising software code portions being configured, when run on a processor, to perform the method according to claim 3.

* * * * *